United States Patent [19]
Kojima et al.

[11] Patent Number: 4,603,938
[45] Date of Patent: Aug. 5, 1986

[54] METHOD OF PRODUCING INLINE HOLOGRAM LENS

[75] Inventors: Chiaki Kojima, Yokohama; Kayoko Hasegawa, Kamakura; Kousuke Miyahara, Yokohama, all of Japan

[73] Assignee: Sony Corporation, Tokyo, Japan

[21] Appl. No.: 527,578

[22] PCT Filed: Nov. 13, 1981

[86] PCT No.: PCT/JP81/00332
 § 371 Date: Jul. 8, 1983
 § 102(e) Date: Jul. 8, 1983

[87] PCT Pub. No.: WO83/01845
 PCT Pub. Date: May 26, 1983

[51] Int. Cl.$^4$ .......................... G02B 5/32; G02B 27/14
[52] U.S. Cl. ..................................... 350/3.72; 350/174
[58] Field of Search .......................... 350/3.6, 3.69, 3.7, 350/3.72, 3.73, 3.82, 3.83, 3.84, 171, 172, 174

[56] References Cited

U.S. PATENT DOCUMENTS

| | | | |
|---|---|---|---|
| 3,580,655 | 5/1971 | Leith et al. | 350/3.6 |
| 3,666,346 | 5/1972 | Lucas | 350/174 |
| 3,673,933 | 7/1972 | Hamann | 350/172 |
| 4,218,111 | 8/1980 | Withrington et al. | 350/3.72 |
| 4,312,559 | 1/1982 | Kojima et al. | 350/3.72 |

OTHER PUBLICATIONS

Sweatt, "Achromatic Triplet Using Holographic Optical Elements" *Applied Optics*, vol. 16, No. 5, May 1977, pp. 1390–1391.
Sincerbox et al., "System to Increase the Efficiency of the Holographic Energy Distribution for Individual Chip Replacement, *IBM Tech.*, vol. 23, No. 2, 7-1980, pp. 831–832.

*Primary Examiner*—John K. Corbin
*Assistant Examiner*—B. S. Shapiro
*Attorney, Agent, or Firm*—Lewis H. Eslinger; Alvin Sinderbrand

[57] ABSTRACT

In this invention, an optical lens element (L1) receiving a wave beam from a common laser source radiating a spherical wave beam and a full reflection mirror (MR) having a small window (W) are employed. This spherical wave beam is irradiated through the small window (W) of the full reflection mirror (MR) onto a hologram record medium (HR1) as a subject wave beam (A). Also, another wave beam from the source is reflected by the full reflection mirror (MR) is simultaneously irradiated onto the hologram record medium (HR1) as a reference wave beam (B). Thus, an inline hologram lens (IN-L) is produced having a large numerical aperture.

9 Claims, 16 Drawing Figures

METHOD OF PRODUCING INLINE HOLOGRAM LENS

DESCRIPTION

1. Technical Field

This invention relates to a method of producing an inline hologram lens in which a full reflection mirror with a small window is used to irradiate a subject wave beam of a spherical wave and a reference wave beam onto a hologram record medium, so that an inline hologram lens can be produced easily.

2. Background Art

As conventional hologram lenses there are proposed an inline hologram lens and an off-axis hologram lens. The recording and reproducing theory of these two hologram lenses will hereinafter be described briefly.

Figure 1:
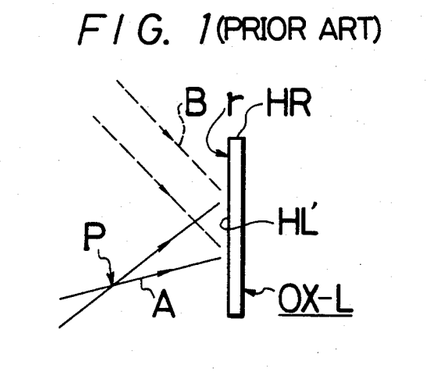
FIGS. 1 to 4 are explanatory diagrams showing the recording and reproducing method of a hologram lens in the prior art.

First, the off-axis hologram lens will be described. As shown in FIG. 1, a record surface (photo-sensitive surface) r of a hologram record medium HR is irradiated with a record subject wave beam (spherical wave beam ) A and a record reference wave beam (plane or spherical wave beam) B each at an incident angle of about 45° with respect to the normal direction, namely, each being off-axis to thereby record thereon an off-axis hologram lens portion HL' of, for example, a circular or ellipse shape, which consists of interference images. Here, the description of the development treatment of the record surface r will be omitted. The record subject wave beam A is provided by using an optical lens and is a beam which converges at a point P and diverges after it. Both the beams A and B are formed from a laser beam emitted from the same laser light source. Thus, an off-axis hologram lens OX-L is made.

Figure 2:
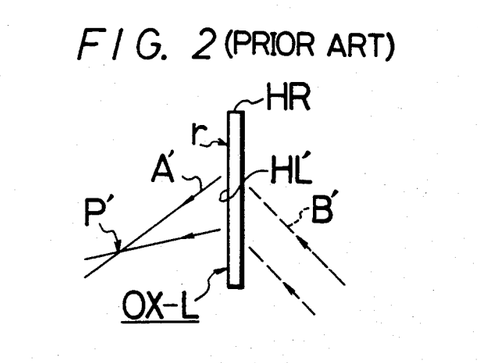

When the off-axis hologram lens OX-L is reproduced, as shown in FIG. 2, a reproduce reference wave beam B' similar to the beam B is irradiated on the off-axis hologram lens portion HL' from the side opposite to the record surface r of the record medium HR along the extending line of the record reference wave beam B shown in FIG. 1. Then, a reproducing subject wave beam A' is reproduced from the side of the record face r which is converged to a point P'. When the reproducing reference wave beam is irradiated on the record surface r of the record medium HR, just like the record reference wave beam B in FIG. 1, a reproduce subject wave beam is reproduced from the surface of the record medium HR opposite to the record surface r which diverges along the extending line of the record subject wave beam A in FIG. 1.

Figure 3:
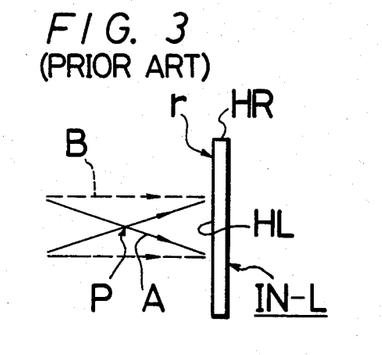

The inline hologram lens will be described. As shown in FIG. 3, the record subject wave beam (spherical wave beam) A and the record reference wave beam (plane or spherical wave beam) B are irradiated on the record surface r of th hologram record medium HR, which beams are coincident or parallel in optical axis in the direction of the normal, that is, in line with each other, to form thereon an inline hologram lens portion HL consisting of interference images. Other arrangements are the same as those in FIG. 1. Thus, an inline hologram lens IN-L is made.

Figure 4:
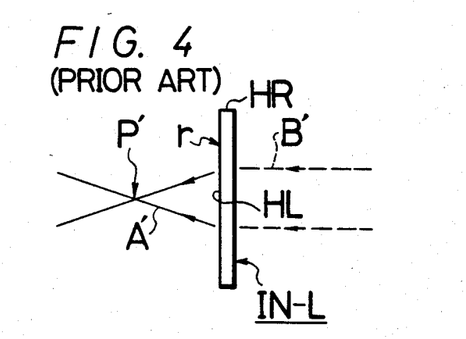

When the inline hologram lens IN-L is reproduced, as shown in FIG. 4, a reproducing reference wave beam B' similar to the beam B is irradiated on the inline hologram lens portion HL from the side opposite to the record surface r of the record medium HR along the extending line of the record reference wave beam B in FIG. 3, a reproduce subject wave beam A' is reproduced from the record surface r which converges at a point P'. In this case, it is also possible that the reproducing reference wave beam is irradiated on the record surface r of the hologram record medium HR to reproduce the diverging subject wave beam. Other arrangements are the same as those in FIG. 2.

The hologram lenses thus made are light in weight and small in size. Moreover, by arbitrarily selecting a mother lens which emits a subject wave beam, it is possible to provide a lens with a desired N. A. (numerical aperture) and operating distance and it is also possible to mass-produce lenses with the same characteristics by duplication.

By the way, an objective lens, which is used, for example, as an optical signal reproduce head in an optical signal reproducing apparatus, is one which has a rather large N. A., and in the prior art an optical lens comprising a plurality of lens groups similar to the objective lens of a microscope, is widely used. However, such an objective lens cannot be made small in size and light in weight, so that a focussing servo for moving the objective lens up and down requires rather large mechanical energy and the servo apparatus becomes complicated and large in size.

Therefore, it is desired to use the above hologram lens as the objective lens of the optical signal reproduce head. However, of the hologram lenses, the off-axis hologram lens is not preferred for use as the objective lens of the optical signal reproduce head for the following points.

One reason is that, since the objective lens is moved up and down by the focussing servo as described above, it is required that the reproducing reference wave beam is simultaneously moved up and down in parallel so as positively to be irradiated on the lens portion of the off-axis hologram lens. In the case of the inline hologram lens, if the optical axis is in parallel to the normal of the inline holograms lens portion, the direction of the movement of the lens is coincident with the direction of the reproducing reference wave beam, so that the above movement is not necessary.

The other reason is that the off-axis hologram lens must be rotated and adjusted for the reproducing reference wave beam about three perpendicular axes with a precision of about ±0.5° to bring the converging point of the reproducing subject wave beam and the optical axis thereof to a predetermined position. This adjustment is very complicated and almost impossible when the N. A. of the lens is large. The inline hologram lens is almost free from the above difficult adjustment.

From the above description, it is understood that the inline hologram lens is suitable for the objective lens of the optical signal reproduce head.

Figure 5:
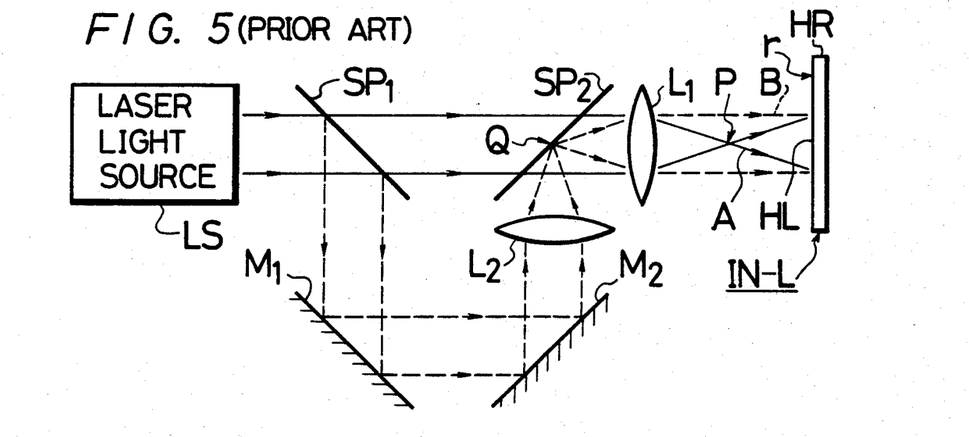
FIG. 5 is an arrangement diagram showing the recording method of the conventional inline hologram lens.

Although the recording method of the inline hologram lens is described briefly with refernce to FIG. 3, it will be described in more detail with reference to FIG. 5. The record subject wave beam A and the record reference wave beam B, which are coincident in optical axis on the normal to the record (photo-sensitive surface) surface r of the hologram record medium HR, are irradiated on a circular area of the surface to form the inline hologram lens portion HL which consists of interference images. Both the beams A and B are provided by the laser beam from a laser light source LS.

The record subject wave beam A is formed in the following manner. A part of the laser beam (plane wave beam) from the laser light source LS is irradiated through two beam splitters SP1 and SP2 on a mother lens (optical convex lens) L1 to produce such a spherical wave beam which is focussed at a point P (which corresponds to the rear focal point of the lens L1) and diverged therefrom and which is used as the record subject wave beam A. The record reference wave beam B is formed in the following manner. A part of the laser beam from the laser light source LS is reflected on the beam splitter SP1, further reflected on two mirrors M1 and M2 and then incident on an auxiliary lens (optical convex lens) L2. The beam emitted therefrom is focussed at a centre point Q (which corresponds to the rear focal point of the lens L2) on the beam splitter SP2, and the beam reflected on and diffused by the beam splitter SP2 is introduced to the mother lens L1 to form the record reference wave beam (which is a parallel plane wave beam) B.

By the way, the N. A. of the inline hologram lens IN-L thus made depends upon the N. A. of the mother lens L1, so that when this inline hologram lens IN-L is used as the objective lens of the optical signal reproduce head, it is necessary to select the N. A. of the inline hologram lens IN-L rather large. Therefore, in this case, lenses with large N. A. must be of course used as the lenses L1 and L2.

When ordinary optical lenses are used as the lenses L1 and L2, a lens comprising a plurality of lens groups must be used such as the objective lens used in a microscope. As the N. A. becomes large, the focal points of the lenses L1 and L2 are positioned within the mirror cylinder, with the result that the recording method for an inline hologram lens as shown in FIG. 5 becomes impossible.

In order to avoid this problem, the following recording method of an inline hologram lens with large N. A. can be used (refer to Japanese patent application laid-open 147339/76). That is, a beam splitter is provided in opposing relation to a hologram record medium, an optical lens comprising a plurality of lens groups is located at the opposite side of the beam splitter as an objective lens, the laser beam from a laser light source is incident on the objective lens, the diverging beam emitted therefrom is irradiated on the hologram record medium through the beam splitter as a record subject wave beam, the laser beam is also incident on an auxiliary lens to be a record reference wave beam, this record reference wave beam is reflected on the above beam splitter, and then the reflected beam is irradiated on the hologram record medium.

However, with the above recording method, since the record subject wave beam (spherical wave beam) from the objective lens passes through the beam splitter, it is subjected to aberration. To avoid this defect, it is necessary that a special objective lens is used thereby to correct the aberration of the record subject wave beam, or a similar beam splitter is provided upon reproduction. In practice, however, this is not so preferred.

In view of such aspect, the present applicant has previously proposed a method of easily producing an inline hologram lens with a large N. A. (numerical aperture).

Now, an example of the method of making an inline hologram lens will be described with reference to FIG. 6. An off-axis hologram lens OX-L, which is made by using a record subject wave beam and a record reference beam which are off-axis relative to each other, is used as a mother lens (objective lens). The method of making the off-axis hologram lens OX-L, particularly the recording method thereof will be described later with reference to FIG. 8. The off-axis hologram lens OX-L is formed of a hologram record medium HR2, which comprises a glass substrate BS' and a photo-sensitive layer (record layer) K' coated thereon. On the centre portion of the photo-sensitive layer K', is recorded a disc-shaped off-axis hologram lens portion HL' which is then developed as described later. In this case, the off-axis hologram lens OX-L is so formed that when a reproducing reference wave beam (plane or spherical wave beam, in this example, the plane wave beam is used) is irradiated on the lens portion HL' in the photo-sensitive layer K' through the glass substrate BS' at an angle of about 45° with respect to the normal on the lens portion, a reproducing subject wave beam is reproduced from the photo-sensitive layer, which has the optical axis on the normal and is focussed at a point P.

Reference numeral HR1 denotes a hologram record medium on which an inline hologram lens IN-L is to be recorded and formed and which is formed of a glass substrate BS and a photo-sensitive layer K.

The off-axis hologram lens OX-L, serving as the mother lens, faces the hologram record medium HR1. In this case, the off-axis hologram lens OX-L is so located for the hologram record medium HR1 that the photo-sensitive layer K of the off-axis hologram lens OX-L is parallel to the photo-sensitive layer K of the hologram record medium HR1 at a predetermined spacing.

The laser beam (parallel plane wave beam) from a laser light source LS is partially reflected on a beam splitter SP, further reflected on a mirror M, and the reflected beam (parallel plane wave beam) is irradiated on the photo-sensitive layer k' through the glass substrate BS' of the off-axis hologram lens OX-L as the reproducing reference wave beam B'. Then, from the off-axis hologram lens OX-L is reproduced the reproducing subject wave beam A' which is focussed at a point P and then diverges therefrom. This beam is incident on the photo-sensitive layer K of the hologram record medium HR1 as a record subject wave beam A.

Meanwhile, the laser beam from the laser light source LS partially passes through the beam splitter SP, then through the off-axis hologram lens OX-L and is incident on the photo-sensitive layer K of the hologram record medium HR1 as a record reference wave beam B which is in inline relation to the record subject wave beam A (namely, the optical axes thereof are coincident with each other). Thus, a disc-shaped inline hologram lens portion HL is formed on the centre portion of the photo-sensitive layer K, which is then subjected to a developing process, which will be described later, to form an inline hologram lens IN-L.

Figure 6:
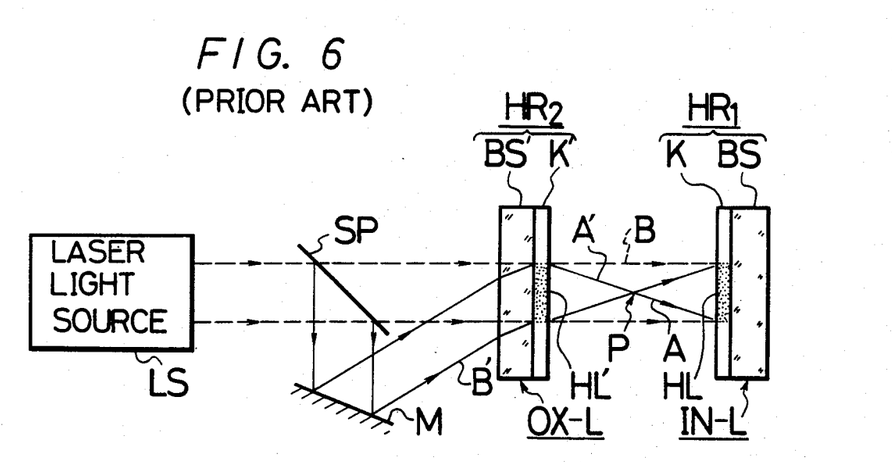
FIG. 6 is an arrangement diagram illustrating an example of the recording method of the previously proposed inline hologram lens producing method.
Figure 7:
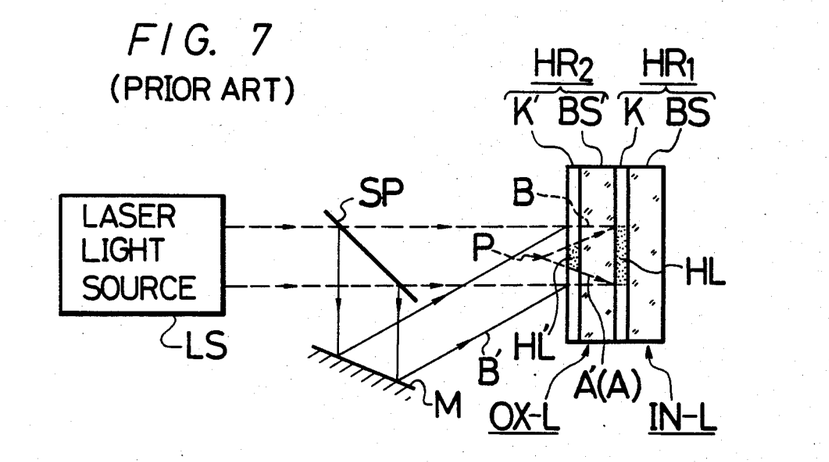
FIG. 7 is an arrangement diagram showing another example of the recording method of the previously proposed inline hologram lens producing method.

It is possible that as shown in FIG. 7, the glass substrate BS' of the off-axis hologram lens OX-L serving as the mother lens is in contact with the photo-sensitive layer K of the hologram record medium HR1 disposed as in FIG. 6 to carry out the recording of the inline hologram lens IN-L. In this case, the reproducing and record subject wave beams A' and A are each such a spherical wave beam which diverges from an imaginary point P.

Now, a description will be given with reference to FIG. 8 of the manner of making the off-axis hologram lens OX-L used as the mother lens shown in FIG. 6. A record subject wave beam (spherical wave) is irradiated on the photo-sensitive layer K of the hologram record medium HR2, which consists of the photo-sensitive layer K and the glass substrate BS, in such a manner that the optical axis thereof is coincident with the normal thereto and a record reference wave beam (parallel plane wave beam) B is also irradiated thereon in such a manner that its optical axis has an incident angle of about 45° with respect to the normal. Thus, a disc-shaped off-axis hologram lens portion HL' is recorded on the centre portion of the photo-sensitive layer K. Thereafter, the photo-sensitive layer K is developed to provide the off-axis hologram lens OX-L.

In this case, the record subject wave beam A is produced in the following manner. That is, the laser beam (parallel plane wave beam) from a laser light source LS is partially passed through a beam splitter SP, is then incident on an auxiliary lens (optical lens) L2, and is then focussed at a point Q (the rear focal point of the lens L2). The spherical wave beam diverging therefrom is incident on a mother lens L1 (an optical lens made of a plurality of lens groups). Then, the spherical wave beam is provided which is converged at a point P and then diverged therefrom. This beam is used as the record subject wave beam A.

The record reference wave beam B is formed in the following manner. That is, the laser beam from the laser light source LS is partially reflected on the beam splitter SP, and then further reflected on a mirror M to form the record reference wave beam B.

An objective lens of a microscope with an N. A. of, for example, 0.4 or 0.5 is employed as the mother lens L1. The aperture of the off-axis hologram lens portion HL' is selected, for example, to be 2 mm in diameter and the operating distance thereof is, for example, 2.3 mm. Accordingly, the inline hologram lens portion HL of the inline hologram lens IN-L shown in FIG. 6 has an aperture and an operating distance which will be determined by a predetermined spacing between the point P and the inline hologram lens portion HL shown in FIG. 6.

Figure 8:
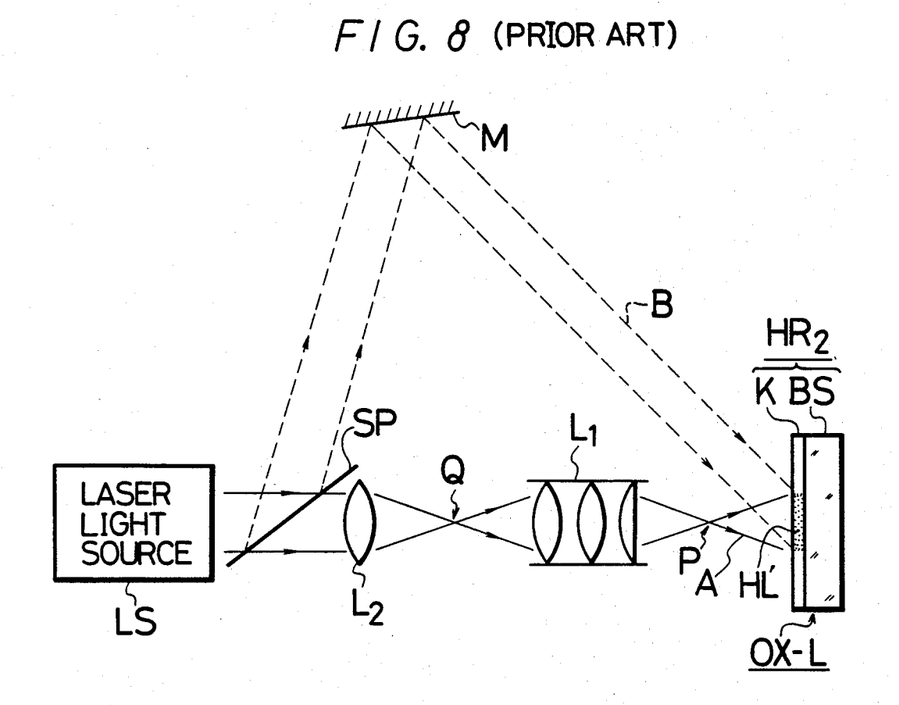
FIG. 8 is an arrangement diagram showing one example of the manufacturing method for the off-axis hologram lens which is used in FIGS. 6 and 7.

As the laser light source LS used in FIGS. 6, 7 and 8, a laser light source may be used which produces one of the following laser beams:

Argon laser beam—($\lambda = 4880$ Å),
Krypton laser beam—($\lambda = 6471$ Å),
Colouring laser beam—($\lambda = 6330$ Å),
He-Ne laser beam—($\lambda = 6328$ Å).

The kind of photo-sensitive layers K of the hologram record media HR1 and HR2 shown in FIGS. 6, 7 and 8 is selected in accordance with the kind of the laser beam.

Next, an example of making the hologram record media HR1 and HR2, and the hologram lenses IN-L and OX-L shown in FIGS. 6, 7 and 8 will be described. A suitable amount of layer hardening agent such as an aqueous solution of gelatin with formaldehyde or gloxal added is kept at about 40° C., while a glass substrate with a thickness of 1 mm and a spinner are similarly kept at about 40° C. Then, the aqueous solution of gelatin is coated on the glass substrate by the spinner. The coating thickness of the gelatin aqueous solution is selected such that the thickness of the dried coating is 5 $\mu$m in the hologram record medium for the off-axis hologram lens and 15 $\mu$m for the inline hologram lens. The gelatin aqueous solution coated on the glass substrate is dried to form a gelatin layer which is a mother material of the photo-sensitive layer. Next, the process for giving the photo-sensitivity to the gelatin layer will be described.

Photo-sensitivity to a blue or green beam is given to the gelatin layer by immersing the gelatin layer in a 2 to 10 weight percents aqueous solution of ammonium bichromate for about ten minutes. It is then gradually removed therefrom, held vertically and dried in a darkroom.

Photo-sensitivity to a red beam is given to the gelatin layer using an aqueous solution containing 2 weight percents of ammonium bichromate and $1 \times 10^{-3}$ mol/l methylene blue pigment to which ammonium is added to give a pH of about 10. The gelatin layer is immersed in this aqueous solution for about ten minutes and then dried in a flowing atmosphere including ammonia and dried nitrogen.

Thus, a hologram record medium is provided having the photo-sensitive layer K formed on the glass substrate. The exposure for the photo-sensitive layer of the hologram record medium is carried out as described in connection with FIGS. 6, 7 and 8. The irradiation energy of the laser beam is selected to be about 100 to 1000 mJ/cm$^2$.

The hologram record medium, with the exposed photo-sensitive layer, is immersed in water. When the photo-sensitive layer is photo-sensitive to the blue or green beam, it is immersed in flowing water at about 20° C. for about one hour, and when the photo-sensitive layer is photo-sensitive to the red beam, it is immersed in hot water at about 40° C. for about thirty minutes. Thereafter, the hologram record medium is immersed in aqueous solution of 50 percent isopropanol for about ten minutes, then dipped in aqueous solution of 90 percent isopropanol for several seconds, then immersed in 100 percent isopropanol for about ten minutes, and then rapidly dried by hot wind. Thus, the developing treatment is finished.

Figure 9:
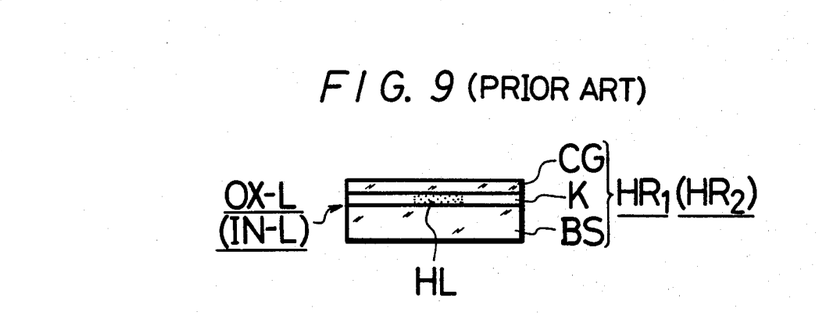
FIG. 9 is a cross-sectional view of the hologram lens manufactured by utilizing the recording method in FIG. 6, 7 or FIG. 8, FIGS. 10 and 11 are arrangement diagrams showing the duplicating recording methods of inline hologram lens.

A photo-sensitive layer, having a gelatin layer as mother material, has a moisture absorption property, so that if it is left as it is, there is a risk of the hologram lens disappearing. To avoid this, as shown in FIG. 9, a cover glass CG of thickness about 150 $\mu$m is bonded to the photo-sensitive layer K by resin which is hardened by ultraviolet rays. Thus, the hologram lenses OX-L and IN-L are made. In other drawings, the cover glass CG is omitted.

Figure 10:
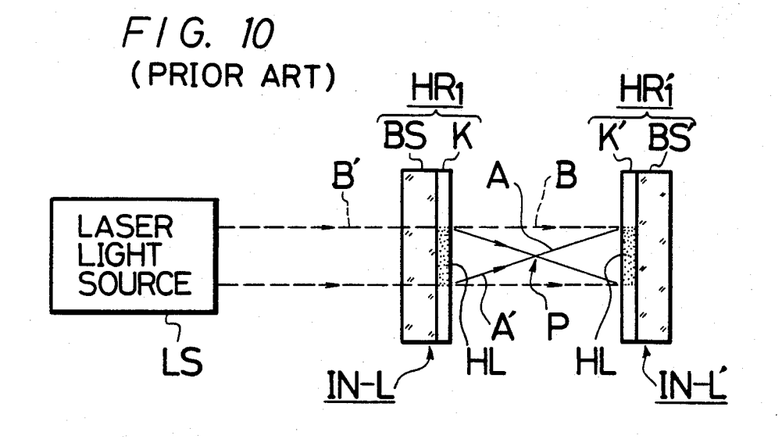

Subsequently, the manner of making a slave inline hologram lens IN-L' using the inline hologram lens IN-L thus produced as the mother lens will be described. As shown in FIG. 10, the hologram record medial HR1 and HR1' are so disposed that the photo-sensitive layer K' of the latter, on which a slave in line hologram lens IN-L' is to be made, faced the photo-sensitive layer K of the former, which has 50 percent diffraction efficiency, with a predetermined distance. Then, the laser beam from the laser light source LS is irradiated on the side of the glass substrate BS of the hologram record medium HR1. A part of the beam (50 percent) is used as a reproducing reference wave beam B' and the remainder (50 percent) is used as a record reference wave beam B for the hologram record medium HR1'. Thus, from the mother inline hologram lens IN-L, is reproduced a reproducing subject wave beam A' which is focussed at a point P and which is in turn irradiated on the hologram record medium HR1' as a record subject wave beam A and then a hologram lens portion HL' is recorded on the photo-sensitive layer K' thereof.

Figure 11:
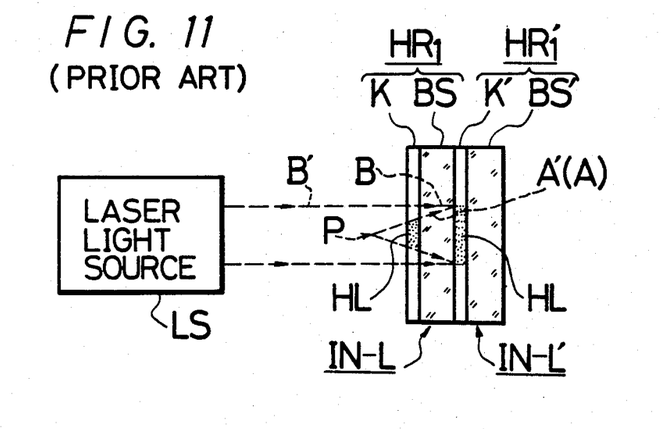

The slave inline hologram lens IN-L' can also be made in the manner shown in FIG. 11. In this case, the photo-sensitive layer K' of the hologram record medium HR1' located in the same order as in FIG. 9 is in direct contact with the glass substrate BS of the mother inline hologram lens IN-L. In this case, the reproducing and record subject wave beams A' and A are both the spherical wave beams diverging from an imaginary point P.

According to the previously proposed method of producing an inline hologram lens as described above, the off-axis hologram lens prepared in advance is used as the mother lens to form the inline hologram lens. Then, if such a mother lens is provided, the inline hologram lens can be produced easily.

The above manufacturing method, however, involves the following problems. That is, the extra process of making the off-axis hologram lens, which serves as the mother lens, is necessary.

Further, it is necessary that the off-axis hologram lens serving as the mother lens be rotated for the reproducing reference wave beam about three axes intersecting at the right angles with each other with an accuracy of ±0.5° and adjusted for the focussing point and optical axis of the reproducing subject wave beam to be brought to a predetermined position. Such adjustment is very troublesome and becomes very difficult, especially when the N. A. of the lens is large. This is caused by the fact that the distribution of the graphic interference patterns of the off-axis hologram lens is not in an axis symmetry different from that of the inline hologram lens, but the pitch of the graphic interference patterns is changed from large to small in the radial direction.

Further, owing to the distribution of the above graphic interference pattern of the off-axis hologram lens, when the thickness of the photo-sensitive layer increases during the moisture-involving process after the exposure of the photo-sensitive layer whose mother material is gelatin, the inclination of the graphic interference pattern on the cross-section thereof is varied and the characteristics of the lens thus become different. This phenomenon becomes large as the N. A. of the off-axis hologram lens becomes large, so that such a case where the hologram lens cannot be used in practice may occur.

DISCLOSURE OF INVENTION

In view of such aspects, the present invention provides the method which can produce the inline hologram lens easily without using the off-axis hologram lens as the mother lens.

In accordance with a producing method of this invention, an optical element radiating a spherical wave beam and a full reflection mirror having a small window are employed. This spherical wave beam is irradiated through the small window of the full reflection mirror onto a hologram record medium as a subject wave beam, while the wave beam reflected by the full reflection mirror is irradiated onto the hologram record medium as a reference wave beam thereby producing an inline hologram lens.

According to the aforesaid producing method of the invention, the inline hologram lens with good accuracy can be obtained quite easily. That is, it becomes unnecessary to prepare the off-axis hologram lens serving as the mother lens, so that the number of the working processes can be reduced. Further, since the off-axis hologram lens as the mother lens is not necessary, the mother lens with very high accuracy such as the objective lens of the microscope can be employed as the optical element so that an inline hologram lens of good accuracy can be provided.

Further, by the arrangement of the present invention an optical element can made to radiate a spherical wave beam with no spherical aberration in which the thickness of the optical path length of the spherical aberration compensating plate (or small window of the full reflection mirror) is selected to be substantially equal to the thickness of the optical path length of a transparent member through which the reproducing beam for a optical record medium passes, the reflected wave beam with no spherical aberration can be produced in spite of the transparent member through which the reproducing beam for the record medium passes.

BEST MODE FOR CARRYING OUT THE INVENTION

An embodiment of a method producing the inline hologram lens according to this invention will hereinafter be described in detail with reference to FIG. 12.

HR1 is the hologram record medium on which the inline hologram lens IN-L is recorded and which consists of the glass substrate BS and the photo-sensitive layer (record layer) K thereon.

L1 represents an optical element (mother lens) for radiating the spherical wave beam, which utilize an objective lens of a microscope with N. A. of, for example, 0.4 or 0.5.

MR represents a full reflection mirror having a small window (light beam-passing portion) W. BS' represents its transparent substrate (glass), MC a reflection diaphragm formed on its surface and NR a non-reflection diaphragm formed on its back surface. In this embodiment, the small window W is a through-hole formed through the center of the mirror MR.

Figure 13:
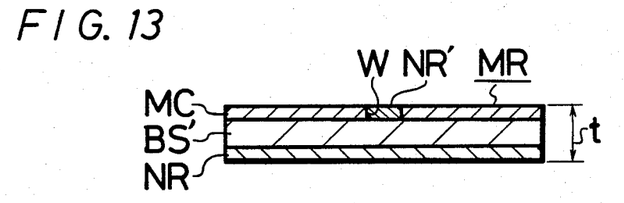
FIG. 13 is a cross-sectional diagram of another embodiment of the full reflection mirror.

As shown in FIG. 13, it is also possible that the full reflection mirror MR does not form the through-hole but may be such one that a non-reflection portion NR' is formed at the center of the reflection diaphragm MC to form the small window W.

The mother lens L1 is located opposite the hologram record medium HR1 and the full reflection mirror MR is disposed therebetween. The hologram record medium HR1 is so located that its photo-sensitive layer K faces to the side of the mother lens L1. The full reflection mirror MR is so inclined that its reflection diaphragm MC faces to the photo-sensitive layer K of the hologram record medium HR1. A spherical aberration compensating plate (transparent plate) V which will be described later is located between the full reflection mirror MR and the hologram record medium HR1 in parallel to the hologram record medium HR1.

The laser beam (parallel plane wave beam) from a common laser light source (for example, argon, krypton, colouring, He-Ne laser light sources and so on) (though not shown) is converged at a certain point by a lens (not shown) to be a diverging spherical wave beam after that point, and this diverging spherical beam is than incident on the mother lens L1 to be converged at the point P from which a spherical wave beam with no spherical aberration diverges. This diverging spherical wave beam which is arranged such that its optical axis X is coincident with respective normals to the compensating plate V and the photo-sensitive layer K of the hologram record medium HR1, passes through the small window W of the full reflection mirror MR at the point P and irradiates the photo-sensitive layer K of the hologram record medium HR1 through the compensating plate V as the record subject wave beam A.

Further, after the laser beam (which is a parallel plane wave beam but a spherical wave beam having almost a plane wave could be used) from the above common laser light source is appropriately altered in direction by a beam splitter, mirror or the like, (not shown) this plane wave beam is reflected by the full reflection mirror MR and then incident through the compensating plate V on the photo-sensitive layer K of the hologram record medium HR1 as a record reference wave beam B. The record subject wave beam A and the record reference wave beam B are in inline relation with each other, namely, each of the respective optical axes X thereof is coincident with the normal to the photo-sensitive layer K of the hologram record medium HR1 and the respective optical axes X are made coincident or parallel to each other as shown in the figure.

In this way, the inline hologram lens portion HL of a disc-shape is formed on the center of the photosensitive layer K of the hologram record medium HR1, which is then subjected to the developing process similar to that of the aforesaid one to produce the inline hologram lens IN-L.

The diameter of the small window W of the full reflection mirror MR may be selected in a range through which the record subject wave beam A can be passed, yet not degrade the function of the inline hologram lens IN-L. For example, when the diameter of the inline hologram lens portion HL is selected as 2 mm, the diameter of the small window W of the full reflection mirror MR is about 100 μm.

An optical information (signal) reproducing apparatus, which uses the inline hologram lens produced by the method as described with reference to FIG. 12 to reproduce a recorded information (signal) on an optical record medium (disc), will now be described with reference to FIG. 14. Also, a relationship between the optical record medium and the spherical aberration compensating plate V or the like will be described. RD designates an optical record medium which comprises a transparent substrate DB (for example, made of vinyl chloride), a reflection diaphragm (layer) RL (for example, an aluminium diaphragm) coated to cover all the surface of pits and lands formed on the lower surface of the transparent substrate DB, and a protective diaphragm (layer) GL (for example, PVA) coated on the lower surface of the reflection diaphragm RL to cover the same.

Figure 12:
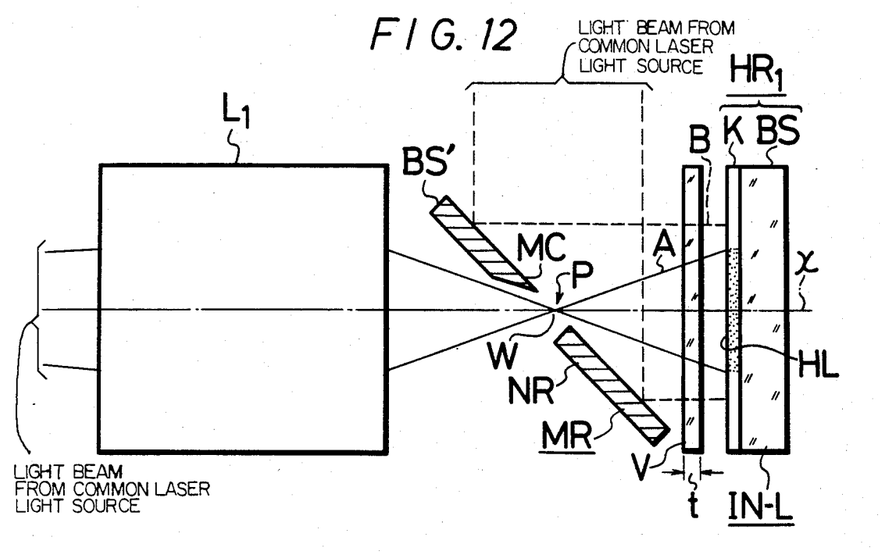
FIG. 12 is an arrangement diagram showing an embodiment of the recording method of inline hologram lens manufacturing method according to the present invention.

The inline hologram lens IN-L (which serves as an objective lens forming a part of the reproducing means) made by the manufacturing method in FIG. 12 is so located that the photo-sensitive layer K thereof faces in parallel to the record medium RD at the side of the substrate DB. Then, the reproducing reference wave beam (plane wave beam) B' irradiates the inline hologram lens portion HL from the side of the glass substrate BS of the inline hologram lens IN-L, and the reproducing subject wave beam A' (the converging spherical wave beam focussed at the pit or land of the reflection diaphragm (layer) RL) thus obtained, irradiates, as the reproduction beam, the reflection diaphragm (layer) RL through the substrate DB from the back of the record medium RD. The reflected wave beam from the reflection diaphragm (layer) RL goes back through the path of the beams A'–B' (or B') and impinges on a photo-electric conversion element (when the laser light source is a semiconductor laser light source) thereby reproduced as an electrical signal.

Figure 14:
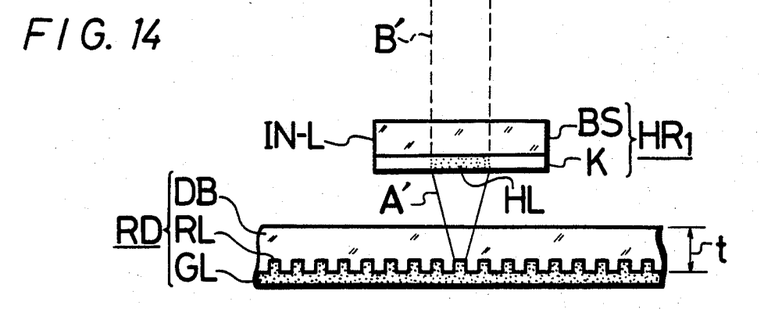
FIG. 14 is an arrangement diagram showing a part of optical information (signal) reproducing apparatus.

But in the case where the record medium RD is optically reproduced from the side of its transparent substrate DB as shown in FIG. 14, if the reproducing subject wave beam A' is a spherical wave beam of no spherical aberration, this spherical wave beam is influenced by spherical aberration when it passes through the transparent substrate DB of thickness t, which thickness is the optical path length. Thus, the reflected wave beam comes to have a spherical aberration.

Therefore, in FIG. 12, if the spherical wave beam having no spherical aberration is derived from the mother lens L1 and the thickness (the optical path length) of the spherical aberration compensating plate V (when the full reflection mirror MR in FIG. 13 is employed, the compensating plate V is not provided but the small window W of the full reflection mirror MR serves therefor) is selected to be substantially the aforementioned ±, the record subject wave beam A in FIG. 12 becomes a spherical wave beam with spherical aberration. Thus, the reproducing subject wave beam A' irradiating the record medium RD becomes a beam with spherical aberration. When this beam passes through the transparent substrate DB, the beam comes to have no aberration, whereby the spherical aberration caused by the transparent substrate DB of the record medium RD is corrected so that a reflected wave beam with no spherical aberration can be obtained. In this case, the practical thickness of the compensating plate V and that of the transparent substrate DB of the record medium RD are both 1.1 mm and the refractive index thereof is about 1.5.

When the reproducing beam irradiates the optical record medium RD from its front side, the reproducing beam is provided with substantially no aberration and, thus, the compensating plate V is not provided when producing the hologram lens $HR_1$.

Since the small window W is provided at the above full reflection mirror MR, the record reference wave beam (reflection wave beam) B is partially dropped at that portion. However, this will not adversely affect the manufacturing of the inline hologram lens IN-L, which fact will be described now.

Figure 15:
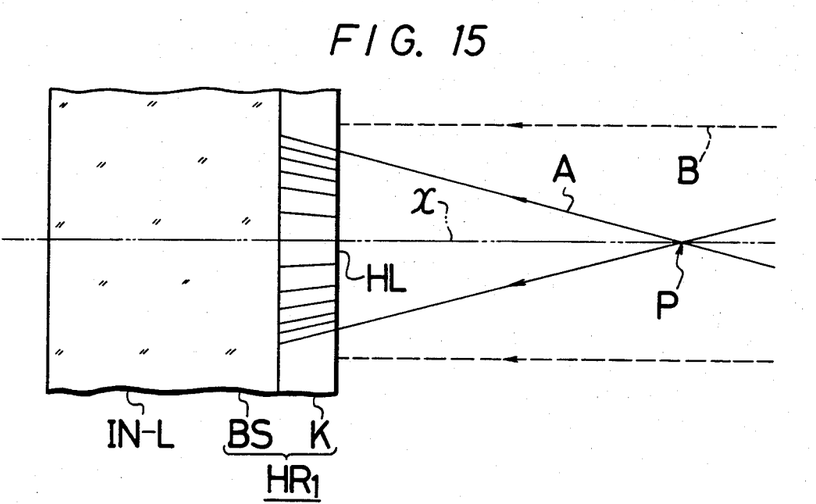
FIG. 15 is an explanatory diagram of the operation of the inline hologram lens.

The inline hologram lens IN-L according to this invention is a kind of a volume-type phase hologram lens. As shown in FIG. 15, the grating surface formed of the graphic interference patterns on the inline hologram lens portion HL which consists of the graphic interference patterns formed on the photo-sensitive layer K by the record subject wave beam A and the record reference wave beam B, each of which is in inline relation with each other has greater pitch at its center, namely, the grating lines are more widely spaced in the portion closer to the optical axis X, while the grating lines are closer together in the portion closer to the periphery (edge) thereof.

If the volume-type phase inline hologram lens satisfies Bragg condition upon reproduction, its diffraction efficiency becomes maximum. However, even if the reproduce beam which can satisfy the Bragg condition is employed, the diffraction efficiency can not always be improved. That is, it is well known that there is a restriction for a value Q expressed by the following equation.

$$Q = (2\pi \lambda d / n \Lambda^2)$$

where $\lambda$ represents the wavelength of the beam, d the thickness of the photo-sensitive layer K (the lens portion HL), n the refractive index of the photo-sensitive layer K (the lens portion HL) and $\Lambda$ the pitch of the grating.

In general, if the value Q is changed by changing d or $\Lambda$, the intensity of the diffraction beam at each order is changed. In this case, when the value Q is selected to satisfy the condition $Q \gg 1$, the intensity of the primary diffraction beam becomes extremely large and the diffraction beams of other orders are suppressed. When $\lambda$, n and d are respectively constant, the condition $Q \gg 1$ can easily be satisfied if the grating pitch $\Lambda$ is selected smaller.

Figure 16:
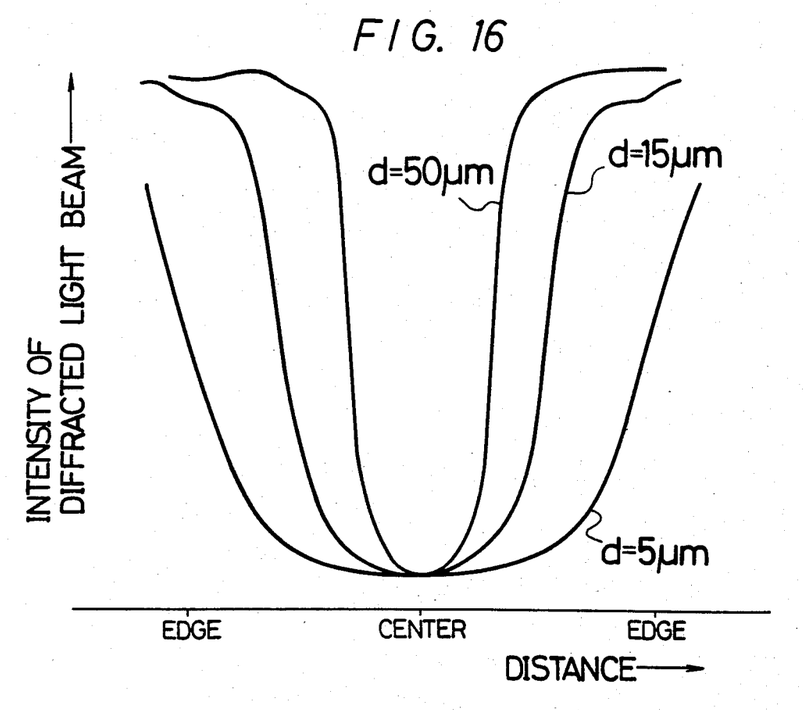
FIG. 16 is a graph.

Therefore, FIG. 16 shows an example of the diffraction efficiency distribution at the aperture face of the inline hologram lens portion HL of the inline hologram lens IN-L. This lens IN-L is recorded and produced by a krypton laser light source (the wavelength of the laser beam is 6471 Å) and the mother lens with N. A. of 0.4. FIG. 16 is a graph showing the characteristics of the intensity of the + primary diffraction beam relative to a distance from the center of the lens portion HL. In this example, a He-Ne laser light source (the wavelength of the laser beam is 6328 Å) is employed as the reproduce laser light source and the thickness d of the inline hologram lens portion HL of the inline hologram lens IN-L is varied as 5 $\mu$m, 15 $\mu$m and 50 $\mu$m. According to this graph, it is understood that the intensity of the + primary diffraction beam at the center of the lens portion HL, or the diffraction efficiency is greatly lowered as compared with those of other portions of the beam at increasing distances from the center.

Accordingly, unless the graphic interference patterns are not formed at the center portion of the lens portion HL in the inline hologram lens IN-L due to the aforementioned reference wave beam B dropped at the central portion thereof, the efficiency of the inline hologram lens will almost not be affected.

INDUSTRIAL APPLICABILITY

The inline hologram lens produced by the producing method of this invention can be used as the objective lens of the optical information reproducing apparatus employing the laser.

We claim:

1. A method of producing an inline hologram lens using first and second interfering wave beams from a common source comprising the steps of employing an optical lens element receiving the first wave beam for radiating a spherical wave beam therefrom, providing a full reflection mirror having a small window formed therein, irradiating said spherical wave beam through the small window of said full reflection mirror with no spherical aberration onto a hologram record medium as a subject wave beam, and, simultaneous with said subject wave beam, irradiating the second wave beam onto said hologram record medium as a reference wave beam by reflecting the second wave beam with said full reflection mirror.

2. A method according to claim 1, in which the inline hologram lens being formed is 2 mm in diameter and including the further step of forming said small window in said full reflection mirror having a diameter of 100 micrometers.

3. A method according to claim 1, in which said step of employing an optical lens element includes the further step of providing said optical lens element as an objective lens of a microscope having a numerical aperture or between 0.4 to 0.5.

4. A method according to claim 1, in which the step of providing a full reflection mirror having a small window formed therein includes the step of forming said small window therein substantially at the center of said mirror.

5. A method according to claim 1, in which the step of providing a full reflection mirror having a small window formed therein includes the step of forming said small window as a nonreflecting portion of glass.

6. A method according to claim 1, in which the step of providing a full reflection mirror having a small window formed therein includes the step of forming said window as a through hole.

7. A method according to claim 1, including the further step of providing a substantially transparent spherical aberration compensation plate arranged between the full reflection mirror and the hologram record medium, thereby forming said inline hologram lens having spherical aberration.

8. A method according to claim 7, in which the step of providing the spherical aberration compensation plates includes the step of arranging the spherical aberration compensation plate parallel to the hologram record medium.

9. A method according to claim 7, in which the inline hologram lens is used in reproducing an information record medium having a transparent substrate and including the further step of forming said transparent spherical aberration compensation plate with a thickness substantially equal to a thickness of said transparent substrate of the information record medium.

* * * * *